United States Patent
Chang et al.

(10) Patent No.: US 9,497,675 B2
(45) Date of Patent: Nov. 15, 2016

(54) METHOD AND APPARATUS FOR JUDGING TYPE OF HANDOVER FAILURE

(71) Applicant: FUJITSU LIMITED, Kawasaki-shi, Kanagawa (JP)

(72) Inventors: Ningjuan Chang, Beijing (CN); Zhaojun Li, Beijing (CN); Weiwei Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 14/480,103

(22) Filed: Sep. 8, 2014

(65) Prior Publication Data

US 2014/0378138 A1    Dec. 25, 2014

Related U.S. Application Data

(63) Continuation of application No. PCT/CN2012/072449, filed on Mar. 16, 2012.

(51) Int. Cl.
*H04W 36/00* (2009.01)

(52) U.S. Cl.
CPC ................................ *H04W 36/0083* (2013.01)

(58) Field of Classification Search
CPC .......................... H04W 36/00; H04W 36/0083
USPC ........................................ 455/436; 370/338
See application file for complete search history.

(56) References Cited

U.S. PATENT DOCUMENTS

2010/0173626 A1* 7/2010 Catovic .............. H04W 76/027
455/423

FOREIGN PATENT DOCUMENTS

| CN | 1889768 A | 1/2007 |
|---|---|---|
| CN | 101043248 A | 9/2007 |
| JP | 2003319432 A | 11/2003 |

* cited by examiner

*Primary Examiner* — Marcos Batista
(74) *Attorney, Agent, or Firm* — Myers Wolin, LLC

(57) ABSTRACT

A method and apparatus for judging type of a handover failure. The method includes: judging type of a handover failure, by a base station of a serving cell where UE is present before a connection failure occurs, according to related information and a maximum measurement result of a downlink signal measured by the UE at the serving cell. The type of a handover failure in a heterogeneous network may be accurately judged by taking the maximum measurement result of the downlink signal of the serving cell into account, thereby enabling the network side to adjust a handover parameter based on the judgment result of the type of the handover failure, so as to ensure the performance of the network.

11 Claims, 12 Drawing Sheets

Abstract figure is Fig. 5

METHOD AND APPARATUS FOR JUDGING TYPE OF HANDOVER FAILURE

CROSS REFERENCE TO RELATED APPLICATIONS

This is a continuation of International Application No. PCT/CN2012/072449, filed on Mar. 16, 2012, now pending, the contents of which are herein wholly incorporated by reference.

TECHNICAL FIELD

The present disclosure relates to the field of communications, and in particular to a method and apparatus for judging type of a handover failure.

BACKGROUND

A self-optimizing network (SON) refers to a network performing self optimization in a certain manner/technique with no need of participation of an operation, administration and maintenance (OAM) entity.

Mobility robustness optimization (MRO) is SON means, with a main object being to detect and correct a connection failure of radio resource control (RRC) during a user moves resulted from improper setting of a network parameter.

Currently, connection failure referred in the MRO includes the following three types.

First Type: Too-Late Handover

The too-late handover refers to that as the handover is triggered too late, a connection failure has occurred when a handover command has not been successfully transmitted to user equipment (UE). After the failure occurs, the UE will initiate connection reestablishment to a reestablished cell (if the network side has finished handover preparation), or will initiate connection reestablishment to other non-source cells (if the network side has not performed handover preparation).

FIG. 1 is a schematic diagram of too-late handover. As shown in FIG. 1, as a parameter (such as a signal difference between a target cell signal and a source cell signal) is set improperly, that is, the signal difference $\Delta'$ between the target cell signal and the source cell signal is set to be relatively large, which is larger than a signal difference $\Delta$ between the target cell signal and the source cell signal of an ideal handover point, thereby resulting in too-late handover.

Second Type: Too-Early Handover

The too-early handover refers to that as the handover is triggered too early, a connection failure occurs resulted from a handover is performed by UE when a signal of the source cell is still strong and a signal of the target cell is still weak. The connection failure may occur shortly after the UE is handed over to the target cell. And after the failure occurs, the UE initiates connection reestablishment to the source cell.

FIG. 2 is a schematic diagram of too-early handover. As shown in FIG. 2, as a parameter (such as a signal difference between the target cell signal and the source cell signal) is set improperly, that is, the signal difference $\Delta'$ between the target cell signal and the source cell signal is set to be relatively small, which is smaller than a signal difference $\Delta$ between the target cell signal and the source cell signal of an ideal handover point, thereby resulting in too-early handover.

Third Type: Handover to Wrong Cell

The handover to wrong cell refers to that, due to improper setting of a handover parameter, UE which should be handed over to a cell A is handed over to a cell B; and at this moment, as signal quality of the cell B is not good, a connection failure is resulted. The connection failure may occur shortly after the UE is handed over to the cell B. And after the failure occurs, the UE initiates connection reestablishment to target cell A.

After the connection failure occurs when the UE is handing over, the UE will attempt to perform RRC connection reestablishment. If the connection reestablishment succeeds, the UE will keep the state of connection with the network side, and acquire services from the network side; and if the connection reestablishment fails, the UE will enter into an idle state, the connection with the network side will be interrupted, and the UE will possibly establish connection with the network side by initiating a new RRC connection reestablishment procedure.

The method for judging type of a handover failure in the MRO shall be described below regarding two cases where UE restores connection with the network side through an RRC reestablishment procedure or by initiating a new RRC connection establishment procedure.

First: After the UE Initiates RRC Connection Reestablishment

1. Too-Late Handover

A radio link failure (RLF) occurs when the UE is in a source cell A, and the UE initiates a connection reestablishment attempt to a cell B, and transmits a connection reestablishment request (RRC) message to the cell B, the request message may include identifier information of the UE and an identifier of a cell where the UE is present when the RLF occurs, that is, an identifier of the source cell A. After receiving the request message, the cell B may transmit an RLF indication message to the source cell A where the RLF occurs according to information in the request message, the indication message including information contained in the RRC connection reestablishment request message; and after receiving the RLF indication message, the source cell A may judge type of the handover failure according to the indication message and saved context information of the UE; if the UE does not receive a handover command according to the context information of the UE, the type of the handover failure may be judged as too-late handover.

2. Too-Early Handover

The UE is successfully handed over from the source cell A to the cell B, after a short period of time, an RLF occurs in the UE, and the UE initiates reestablishment connection to the cell A. During the procedure of the reestablishment connection, the UE transmits information, such as a user identifier and an identifier of the cell B where the UE is present when the link failure occurs to the cell A; the cell A transmits an RLF indication message to the cell B according to the obtained information; and if the cell B finds that a duration of the UE staying in the cell B is less than a parameter Tstore_UE_cntxt after receiving the message, it is judged that the UE turns back to the source cell A shortly after being connected to the cell B, and the cell B judges that too-early handover occurs in the UE.

3. Handover to Wrong Cell

The UE is successfully handed over from the source cell A to the cell B, but a connection failure occurs after a short period of time. The UE initiates a reestablishment connection to a cell C, and at this moment, the cell C transmits an RLF indication message to the cell B, information contained in the message being similar to that as described above; and if the cell B finds that a duration of the UE connected to the cell B is less than a parameter Tstore_UE_cntxt after receiving the message, it is judged that the UE is connected to the cell C shortly after being connected to the cell B, and the cell B judges that handover to wrong cell occurs in the UE.

Second: After the UE Initiates a New RRC Connection Reestablishment Procedure

1. Too-Late Handover

An RLF occurs when the UE is in the source cell A, and the UE initiates a connection reestablishment attempt to the cell B and the reestablishment fails. Then the UE initiates an RRC connection establishment procedure to the cell C (a cell selected via cell reselection, which may also be the cell A or B) via a cell reselection procedure, and reports an RLF report, the RLF report including an identifier of the cell where the UE is present when the RLF occurs, that is, an identifier of the source cell A, and sometimes further including a parameter timeConnFailure, which records a period of time experienced by the UE from receiving a handover command message for the last time to the occurrence of the link failure. The cell C transmits the RLF report reported by the UE via an RLF indication message to the source cell A where the RLF occurs. And if the source cell finds that the parameter timeConnFailure is not included in the RLF report or a value of the parameter timeConnFailure is greater than a preset value Tstore_UE_cntxt, the source cell A records this time of connection failure event as too-late handover.

2. Too-Early Handover

The UE is successfully handed over from the source cell A to the cell B, after a short period of time, an RLF occurs in the UE, and the UE initiates a connection reestablishment attempt to the source cell A and the reestablishment fails. Then the UE initiates an RRC connection establishment procedure to the cell C (a cell selected via cell reselection, which may also be the cell A or B) via a cell reselection procedure, and reports an RLF report, the RLF report including an identifier of the cell B where the UE is present when the RLF occurs and the parameter timeConnFailure. The cell C transmits the RLF report to the cell B via an RLF indication message. And after the cell B obtains the RLF report, if the parameter timeConnFailure is less than Tstore_UE_cntxt and the reestablished cell of the UE is a cell triggering the latest handover before the connection fails, it is judged that this time of connection failure event is too-early handover.

3. Handover to Wrong Cell

The UE is successfully handed over from the source cell A to the cell B, but an RLF occurs after a short period of time, and the UE initiates a connection reestablishment attempt to the cell C and the reestablishment fails. Then the UE initiates an RRC connection establishment procedure to a cell D via a cell reselection procedure, and reports an RLF report. The UE initiates reestablishment connection to the cell D, and at this moment, the cell D transmits an RLF indication message to the cell B, information contained in the message being similar to that as described above; and if the cell B, after receiving the message, finds that the parameter timeConnFailure is less than the parameter Tstore_UE_cntxt and the reestablished cell C of the UE is neither a source cell for the latest handover before the connection fails, nor a target cell, it is judged that this time of connection failure event is handover to wrong cell.

However, in the implementation of the present disclosure, the inventors found that a defect exists in the prior art is: for a heterogeneous network deployed with a relatively small cell (such as a pico, and an RRH, etc.), it is possible that judgment error will occur, thereby resulting in that setting parameters cannot be adjusted in time, and the network performance is affected.

SUMMARY

An object of embodiments of the present disclosure is to provide a method and apparatus for judging type of a handover failure. The type of a handover failure may be accurately judged by using a maximum measurement result of a downlink signal measured by UE at its serving cell before an RLF occurs.

According to an aspect of the embodiments of the present disclosure, there is provided a method for judging type of a handover failure, including: judging type of a handover failure, by a base station of a serving cell where UE is present before a connection failure occurs, according to related information and a maximum measurement result of a downlink signal measured by the UE at the serving cell.

According to another aspect of the embodiments of the present disclosure, there is provided a method for judging type of a handover failure, including: recording, by UE, a maximum measurement result of a downlink signal measured at a serving cell; and reporting the maximum measurement result of the downlink signal to a network side after a connection failure occurs.

According to still another aspect of the embodiments of the present disclosure, there is provided a method for judging type of a handover failure, including: receiving, after a connection failure occurs in UE, a maximum measurement result of a downlink signal reported by the UE and measured by the UE at a serving cell where the UE is present before the connection failure occurs; and reporting the maximum measurement result of the downlink signal to the serving cell where the UE is present before the connection failure occurs, so that the serving cell judges type of the handover failure by using the maximum measurement result of the downlink signal.

According to still another aspect of the embodiments of the present disclosure, there is provided an apparatus for judging type of a handover failure, including: a processing unit configured to judge type of a handover failure according to a maximum measurement result of a downlink signal obtained from a network side and measured by UE at a serving cell where the UE is present before connection failure occurs and related information.

According to still another aspect of the embodiments of the present disclosure, there is provided UE, including:
a recording unit configured to record a maximum measurement result of a downlink signal measured by the UE at a serving cell; and a reporting unit configured to report the maximum measurement result of the downlink signal to a network side after a connection failure occurs in the UE.

According to still another aspect of the embodiments of the present disclosure, there is provided an apparatus for judging type of a handover failure, including:
a second receiving unit configured to, after a connection failure occurs in UE, receive a maximum measurement result of a downlink signal reported by the UE and measured by the UE at a serving cell where the UE is present before the connection failure occurs; and
a second notifying unit configured to report the maximum measurement result of the downlink signal to the serving cell where the UE is present before the connection failure occurs, so that the serving cell judges type of the handover failure by using the maximum measurement result of the downlink signal.

According to still another aspect of the embodiments of the present disclosure, there is provided a method for configuring a handover parameter, including:

configuring a handover parameter or a reference range of a handover parameter according to related information, the related information being one or more of the following: a size of a cell, a type of a cell, a speed of UE, and a manner for restoring connection to UE.

According to still another aspect of the embodiments of the present disclosure, there is provided an apparatus for configuring a handover parameter, including:

a configuring unit configured to configure a handover parameter or a reference range of a handover parameter according to related information, the related information being one or more of the following: a size of a cell, a type of a cell, a speed of UE, and a manner for restoring connection to UE.

According to still another aspect of the embodiments of the present disclosure, there is provided a computer-readable program, wherein when the program is executed in an apparatus for judging type of a handover failure, the program enables a computer to carry out the method for judging type of a handover failure as described above in the apparatus for judging type of a handover failure.

According to still another aspect of the embodiments of the present disclosure, there is provided a storage medium in which a computer-readable program is stored, wherein the computer-readable program enables a computer to carry out the method for judging type of a handover failure as described above in an apparatus for judging type of a handover failure.

According to still another aspect of the embodiments of the present disclosure, there is provided a computer-readable program, wherein when the program is executed in UE, the program enables a computer to carry out the method for judging type of a handover failure as described above in the UE.

According to still another aspect of the embodiments of the present disclosure, there is provided a storage medium in which a computer-readable program is stored, wherein the computer-readable program enables a computer to carry out the method for judging type of a handover failure as described above in UE.

According to still another aspect of the embodiments of the present disclosure, there is provided a computer-readable program, wherein when the program is executed in an apparatus for configuring a handover parameter, the program enables a computer to carry out the method for configuring a handover parameter as described above in the apparatus for configuring a handover parameter.

According to still another aspect of the embodiments of the present disclosure, there is provided a storage medium in which a computer-readable program is stored, wherein the computer-readable program enables a computer to carry out the method for configuring a handover parameter as described above in an apparatus for configuring a handover parameter.

An advantage of the embodiments of the present disclosure resides in that based on an existing judgment mechanism, the type of a handover failure may be accurately judged by using a maximum measurement result of a downlink signal measured by UE at its serving cell before an RLF occurs, thereby solving a problem of misjudgment in an existing heterogeneous network.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including/comprise/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and other objects, features and advantages of the present disclosure will be apparent from the following detailed description in conjunction with the drawings, in which.

DETAILED DESCRIPTION

Various embodiments of the present disclosure shall be described below with reference to the accompanying drawings. These embodiments are illustrative only and are not intended to limit the present disclosure. For easy understanding of the principle and embodiments of the present disclosure by those skilled in the art, the embodiments of the present disclosure shall be described taking judgment of type of handover in a heterogeneous network as an example. However, it should be understood that the present disclosure is not limited thereto, and is applicable to other systems related to judgment of type of handover.

Currently, for a heterogeneous network deployed with a relatively small cell (such as a pico, and an RRH, etc.), if an existing method for judging type of a handover is employed, a case of misjudgment will possibly occur, which shall be described below taking particular scenarios as examples.

Figure 1:
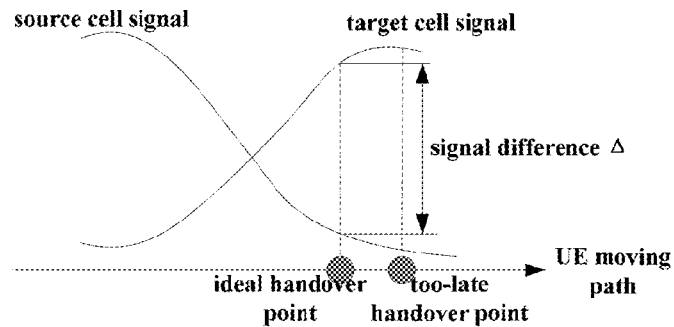
FIG. 1 is a schematic diagram of too-late handover.
Figure 2:
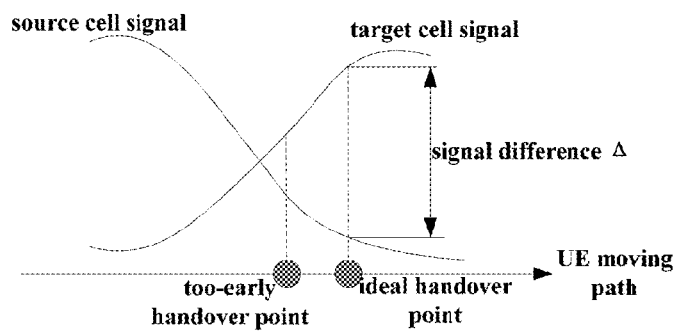
FIG. 2 is a schematic diagram of too-early handover.
Figure 3:
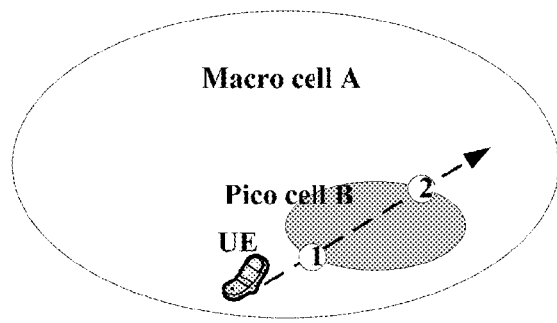
FIG. 3 is a schematic diagram of a scenario in a heterogeneous network.

FIG. 3 is a schematic diagram of a scenario in a heterogeneous network. As shown in FIG. 3, a pico cell B is deployed in a macro cell A, the dotted line denotes moving track of UE, and at point 1, the UE is handed over successfully from the cell A to the cell B (which is referred to as handover 1). When a moving speed of the UE is relatively fast, as the coverage of the cell B is relatively small, the UE needs to be handed over again from the cell B to the cell A shortly after the handover 1 succeeds. Since the speed of the UE is relatively fast, if handover is not in time, a connection failure will occur when the UE is handed over from the cell B to the cell A (which is referred to as handover 2), and the UE after the occurrence of the connection failure will initiate RRC connection reestablishment to the cell A. If a period from the handover 1 to the handover 2, i.e. duration of the UE staying in the cell B, is less than a parameter Tstore_UE_cntxt, the connection failure event shall be deemed as too-early handover of handover 1 according to an existing MRO judgment rule. Actually, however, it should be too-early handover of handover 2.

Figure 4:
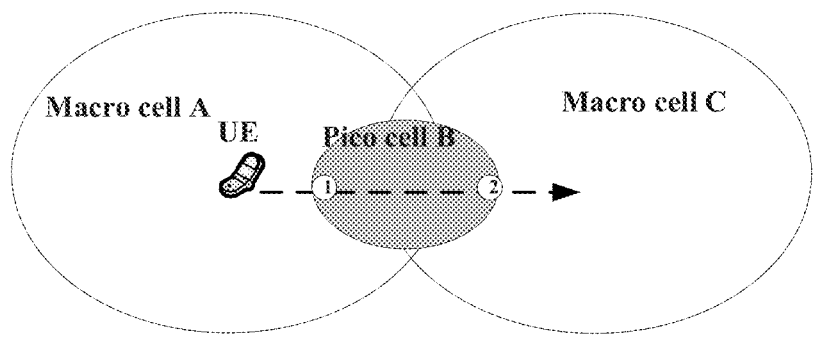
FIG. 4 is a schematic diagram of another scenario in a heterogeneous network.

FIG. 4 is another schematic diagram of a scenario in a heterogeneous network. As shown in FIG. 4, a pico cell B is deployed at edges of macro cells A and C, the dotted line denotes moving track of UE, and at point 1, the UE is handed over successfully from the cell A to the cell B (which is referred to as handover 1). When a moving speed of the UE is relatively fast, as the coverage of the cell B is relatively small, the UE needs to be handed over again from the cell B to a cell C shortly after the handover 1 succeeds. Since the speed of the UE is relatively fast, if handover is not in time, a connection failure will occur when the UE is handed over from the cell B to the cell C (which is referred to as handover 2), and the UE after the occurrence of the connection failure will initiate RRC connection reestablishment to the cell C. If a period from the handover 1 to the handover 2, i.e. duration of the UE staying in the cell B, is less than a parameter Tstore_UE_cntxt, the connection failure event shall be deemed as handover to wrong cell of handover 1 according to an existing MRO judgment rule. Actually, however, it should be too-late handover of handover 2.

In order to solve the above problem of misjudgment, embodiments of the present disclosure provide a method and apparatus for judging type of a handover failure. Judgment of type of a handover failure is performed not only according to information elements that have been defined, such as a source cell identifier, a reestablished cell identifier, and a time parameter, etc., but also taking the following parameter into account, that is, a maximum measurement result of a downlink signal measured by the UE at the serving cell, such as reference signal received power (RSRP), or reference signal received quality (RSRQ), during the UE stays in the serving cell before the RLF occurs.

The embodiments of the present disclosure shall be described below in detail with reference to the accompanying drawings.

Figure 5:
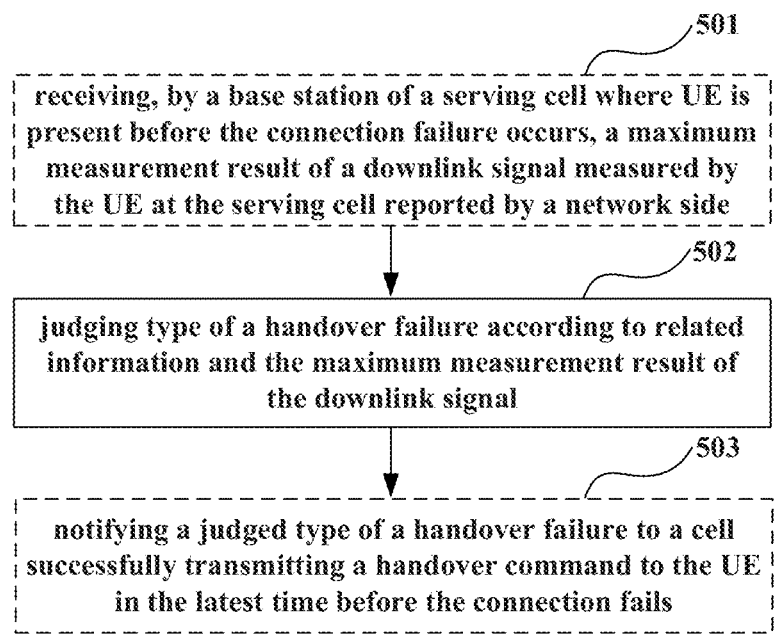
FIG. 5 is a flowchart of a method for judging type of a handover failure of Embodiment 1 of the present disclosure.

FIG. 5 is a flowchart of a method for judging type of a handover failure of Embodiment 1 of the present disclosure. The method includes:

step 501: receiving, by a base station of a serving cell (which is also a cell where a connection failure occurs) where UE is present before the connection failure occurs, a maximum measurement result of a downlink signal measured by the UE at the serving cell reported by a network side;

in this embodiment, the maximum measurement result of the downlink signal may be RSRP and RSRQ, and the network side may be a reestablished cell or a newly-established cell to which the UE is connected through reestablishment or new establishment after the connection fails;

step 502: judging type of a handover failure according to related information and the maximum measurement result of the downlink signal measured by the UE at the serving cell; and step 503: notifying a judged type of a handover failure to a cell successfully transmitting a handover command to the UE in the latest time before the connection fails.

In this embodiment, the related information may include information elements that have been defined. For example, it may include: duration of the UE staying in the serving cell or a period of time experienced by the UE from receiving a handover command message for the last time to the occurrence of the link failure, and a cell identifier of a cell which successfully transmits a handover command to the UE in the latest time before the connection fails, a target cell identifier and a reestablished cell identifier.

In this embodiment, a manner of obtaining the related information is similar to an existing manner of judgment, which shall not be described herein any further. And the maximum measurement result of the downlink signal may be obtained from the network side. For example, when connection of the UE fails, after establishing connection to a reestablished cell or a newly-established cell via a connection reestablishment procedure or a new connection establishment procedure, the maximum measurement result of the downlink signal is obtained from the reestablished cell or the newly-established cell.

In the above embodiment, for the method for judging type of a handover failure, steps 501 and 503 are optional, and with step 503, the cell successfully transmitting the handover command to the UE in the latest time before the connection fails is enabled to adjust a set handover parameter according to a result of judgment, so as to ensure the network performance, and this step is optional.

It can be seen from the above embodiment that in judging type of a handover failure, the judgment of the type of a handover failure is performed by combining an existing manner of judgment and new information, i.e. the maximum measurement result of the downlink signal, thereby the result of judgment is made accurate and occurrence of misjudgment in the heterogeneous network is avoided.

In this embodiment, in judging type of a handover failure in step 502, following manners may be employed:

1. The connection is restored through connection reestablishment after the connection of the UE fails when the duration of the UE staying in the serving cell is less than a first predefined value, the reestablished cell to which the UE attempts to reestablish is the cell successfully transmitting a handover command to the UE in the latest time before the connection fails, and the maximum measurement result of the downlink signal is less than a second predefined value, the type of the handover failure is too-early handover of the latest handover before the connection fails;

when the duration of the UE staying in the serving cell is less than a first predefined value, the reestablished cell to which the UE attempts to reestablish is the cell successfully transmitting a handover command to the UE in the latest time before the connection fails, and the maximum measurement result of the downlink signal is greater than a second predefined value, the type of the handover failure is too-late handover of a handover from the serving cell to the reestablished cell;

when the duration of the UE staying in the serving cell is less than a first predefined value, the reestablished cell to which the UE attempts to reestablish is not a target cell or a cell successfully transmitting a handover command to the UE in the latest time before the connection fails, and the maximum measurement result of the downlink signal is less than a second predefined value, the type of the handover failure is handover to wrong cell of the latest handover before the connection fails;

and when the duration of the UE staying in the serving cell is less than a first predefined value, the reestablished cell to which the UE attempts to reestablish is not a target cell or a cell successfully transmitting a handover command to the UE in the latest time before the connection fails, and the maximum measurement result of the downlink signal is greater than a second predefined value, the type of the handover failure is too-late handover of a handover from the serving cell to the reestablished cell.

2. The connection is restored through a new connection establishment procedure when connection fails through connection reestablishment after the connection of the UE fails when a period of time experienced by the UE from receiving a handover command message for the last time to the occurrence of the link failure is less than a third predefined value, the reestablished cell of the UE is the cell successfully transmitting a handover command to the UE in the latest time before the connection fails, and the maximum measurement result of the downlink signal is less than a fourth predefined value, the type of the handover failure is too-early handover of the latest handover before the connection fails;

when a period of time experienced by the UE from receiving a handover command message for the last time to the occurrence of the link failure is less than a third predefined value, the reestablished cell of the UE is the cell successfully transmitting a handover command to the UE in the latest time before the connection fails, and the maximum measurement result of the downlink signal is greater than a fourth predefined value, the type of the handover failure is too-late handover of a handover from the serving cell to the reestablished cell;

when a period of time experienced by the UE from receiving a handover command message for the last time to the occurrence of the link failure is less than a third predefined value, the reestablished cell of the UE is not a target cell or a cell successfully transmitting a handover command to the UE in the latest time before the connection fails, and the maximum measurement result of the downlink signal is less than a fourth predefined value, the type of the handover failure is handover to wrong cell of the latest handover before the connection fails;

and when a period of time experienced by the UE from receiving a handover command message for the last time to the occurrence of the link failure is less than a third predefined value, the reestablished cell of the UE is not a target cell or a cell successfully transmitting a handover command to the UE in the latest time before the connection fails, and the maximum measurement result of the downlink signal is greater than a fourth predefined value, the type of the handover failure is too-late handover of a handover from the serving cell to the reestablished cell.

In the above embodiment, the first predefined value and the third predefined value may be identical or different, and the second predefined value and the fourth predefined value may be identical or different, which may be determined according to an actual situation.

Figure 6:
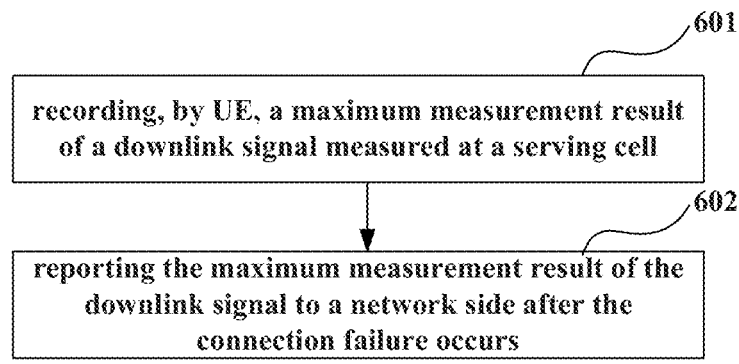
FIG. 6 is a flowchart of a method for judging type of a handover failure of Embodiment 2 of the present disclosure.

FIG. 6 is a flowchart of a method for judging type of a handover failure of Embodiment 2 of the present disclosure. As shown in FIG. 6, the method includes:

step 601: recording, by UE, a maximum measurement result of a downlink signal measured at a serving cell;

for example, after the UE is successfully handed over from a cell A (a cell successfully transmitting a handover command to the UE in the latest time before the connection fails) to a cell B, during staying in the cell B (a serving cell), the UE records the maximum measurement result of the downlink signal obtained by measuring to the serving cell, such as RSRP or RSRQ;

step 602: reporting the maximum measurement result of the downlink signal to a network side after the connection failure occurs.

In this embodiment, before the UE records the maximum measurement result of the downlink signal, whether the serving cell is a relatively small cell, such as a pico cell, may be determined first; and if yes, it records the maximum measurement result of the downlink signal, and reports to the network side when a connection failure occurs in the UE; otherwise, no recording or transmission is needed, thereby the waste of a storage space may be avoided.

Figure 7:
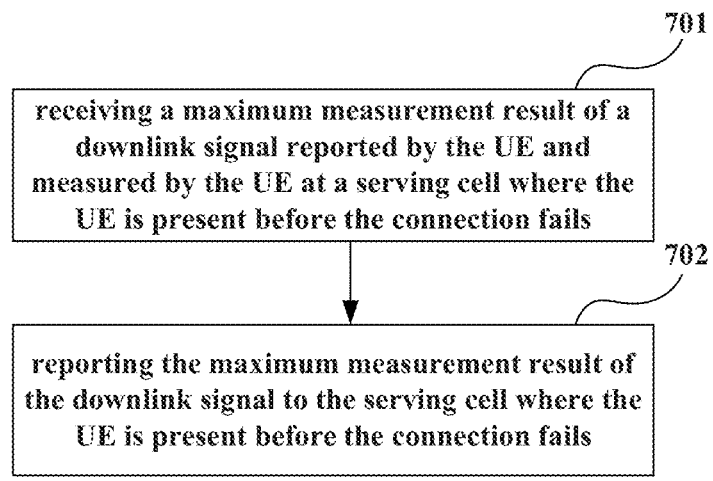
FIG. 7 is a flowchart of a method for judging type of a handover failure of Embodiment 3 of the present disclosure.

FIG. 7 is a flowchart of a method for judging type of a handover failure of Embodiment 3 of the present disclosure. As shown in FIG. 7, the method includes:

step 701: receiving, after a connection failure occurs in UE, a maximum measurement result of a downlink signal reported by the UE and measured by the UE at a serving cell where the UE is present before the connection fails; and step 702: reporting the maximum measurement result of the downlink signal to the serving cell where the UE is present before the connection fails, so that the serving cell judges type of the handover failure by using the maximum measurement result of the downlink signal.

It can be seen from the above embodiment that the UE may report the measured maximum measurement result of the downlink signal of the serving cell to a network side, so that network side reports the information to the serving cell where the UE is present before the connection fails (a connection failure cell), such that the connection failure cell may perform judging of the handover failure accurately by using the maximum measurement result of the downlink signal.

The method for judging type of a handover failure of the embodiments of the present disclosure shall be described below by way of examples.

Figure 8:
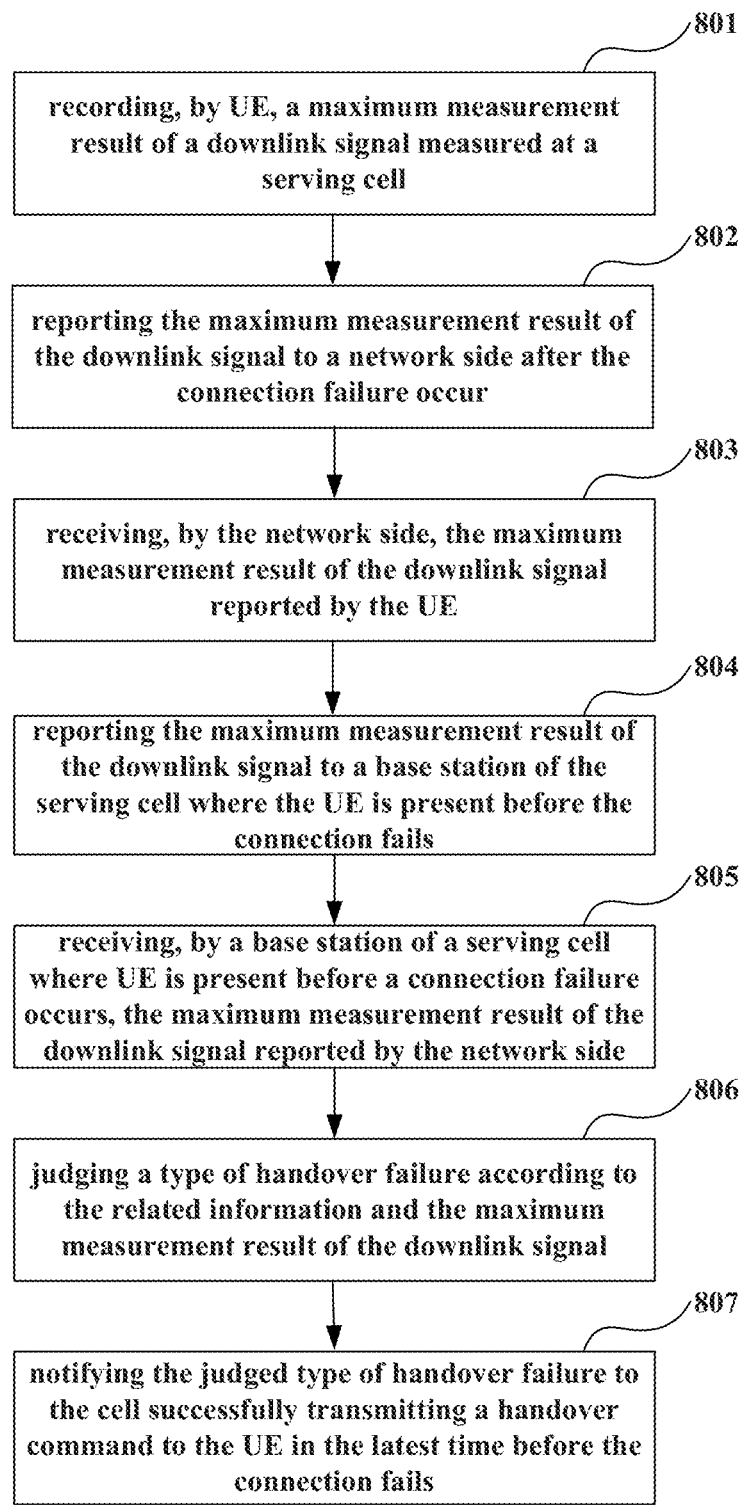
FIG. 8 is a flowchart of a method for judging type of a handover failure of Embodiment 4 of the present disclosure.

FIG. 8 is a flowchart of a method for judging type of a handover failure of Embodiment 4 of the present disclosure. As shown in FIG. 8, the method includes:

step 801: recording, by UE, a maximum measurement result of a downlink signal measured at a serving cell;

in this embodiment, for example, after the UE is successfully handed over from a cell A (a cell successfully transmitting a handover command to the UE in the latest time before the connection fails, which is a source cell here) to a cell B (a serving cell), during staying in the cell B, the UE records the maximum measurement result of the downlink signal obtained by measuring to the serving cell, such as RSRP or RSRQ;

step 802: reporting the maximum measurement result of the downlink signal by the UE to a network side after the connection failure occurs;

in this embodiment, after the occurrence of the connection failure, the UE may report the recorded maximum measurement result of the downlink signal to the network side, while reporting the connection failure event of this time to the network side; wherein, the maximum measurement result of the downlink signal may be included in a connection reestablishment request (an RRC connection reestablishment request) message or a UE information response message or other RRC messages for reporting to the network side, and the connection failure event of this time may also be reported to the network side;

step 803: receiving, by the network side, the maximum measurement result of the downlink signal reported by the UE and measured by the UE at the serving cell where the UE is present before the connection fails;

in this embodiment, the network side may be a reestablished cell to which the UE initiates connection reestablishment, or may be a newly-established cell to which the UE initiates new connection establishment;

step 804: reporting the maximum measurement result of the downlink signal to a base station of the serving cell where the UE is present before the connection fails;

in this embodiment, the reestablished cell or the newly-established cell may transmit an RLF indication message including the maximum measurement result of the downlink signal obtained from the UE to the cell where the connection failure occurs in the UE (the cell B);

step 805: receiving, by a base station of the cell where the connection failure occurs (the cell B), the maximum measurement result of the downlink signal obtained by the UE by measuring at the serving cell and reported by the network side;

in this embodiment, the cell where the connection failure occurs may further obtain other related information of connection failure of this time in an existing mechanism, which is as described above, and shall not be described herein any further;

step 806: judging a type of handover failure by the base station of the cell where the connection failure occurs (the cell B) according to the related information and the maximum measurement result of the downlink signal measured by the UE at the serving cell;

in this embodiment, the base station of the cell where the connection failure occurs (the cell B) judges whether too-early handover/handover to wrong cell (as shown in FIGS. 3 and 4) of the handover 1 or too-late handover of the handover 2 occurs according to the maximum measurement result of the downlink signal reported by the UE and the related information; a particular judgment manner is as follows:

when all the related information that has been defined in the existing mechanism (a particular judgment manner is similar to that in an existing mechanism, which has been described in the Background, and shall not be described in an expanded manner) is satisfied and the maximum measurement result of the downlink signal reported by the UE is less than a predetermined threshold value Th, it is judged that the connection failure event is too-early handover or handover to wrong cell of the handover 1; otherwise, the connection failure event is too-late handover of the handover 2;

step 807: notifying the judged type of handover failure by the serving cell to the cell A (the cell successfully transmitting a handover command to the UE in the latest time);

in this embodiment, in step 807, when it is judged as too-early handover or handover to wrong cell, the cell where the connection failure occurs (the cell B) transmits a handover report (HO report) message to the cell A, informing that too-early handover or handover to wrong cell occurs.

It can be seen from the above embodiment that the UE reports the measured maximum measurement result of the downlink signal of the serving cell to the network side, so that the network side reports the information to the cell where the UE is present before the connection fails (the connection failure cell), such that the connection failure cell may perform judging of handover failure accurately by using the maximum measurement result of the downlink signal.

The method of judgment of the embodiments of the present disclosure shall be described below with reference to accompanying drawings and particular scenarios (as shown in FIGS. 3 and 4).

With reference to the scenario shown in FIG. 3, when the UE is handed over from the cell A to the cell B (handover 1) and a moving speed of the UE is relatively fast, as the coverage of the cell B is relatively small, the UE possibly needs to be handed over back from the cell B to the cell A (handover 2) in a short period of time. If the handover is not in time, a link failure will occur. For such a scenario, whether the link failure is resulted from too-early handover of the handover 1 or too-late handover of the handover 2 cannot be judged accurately according to an existing judgment mechanism, while such a problem may be solved by Embodiment 5 of the present disclosure.

Figure 9:
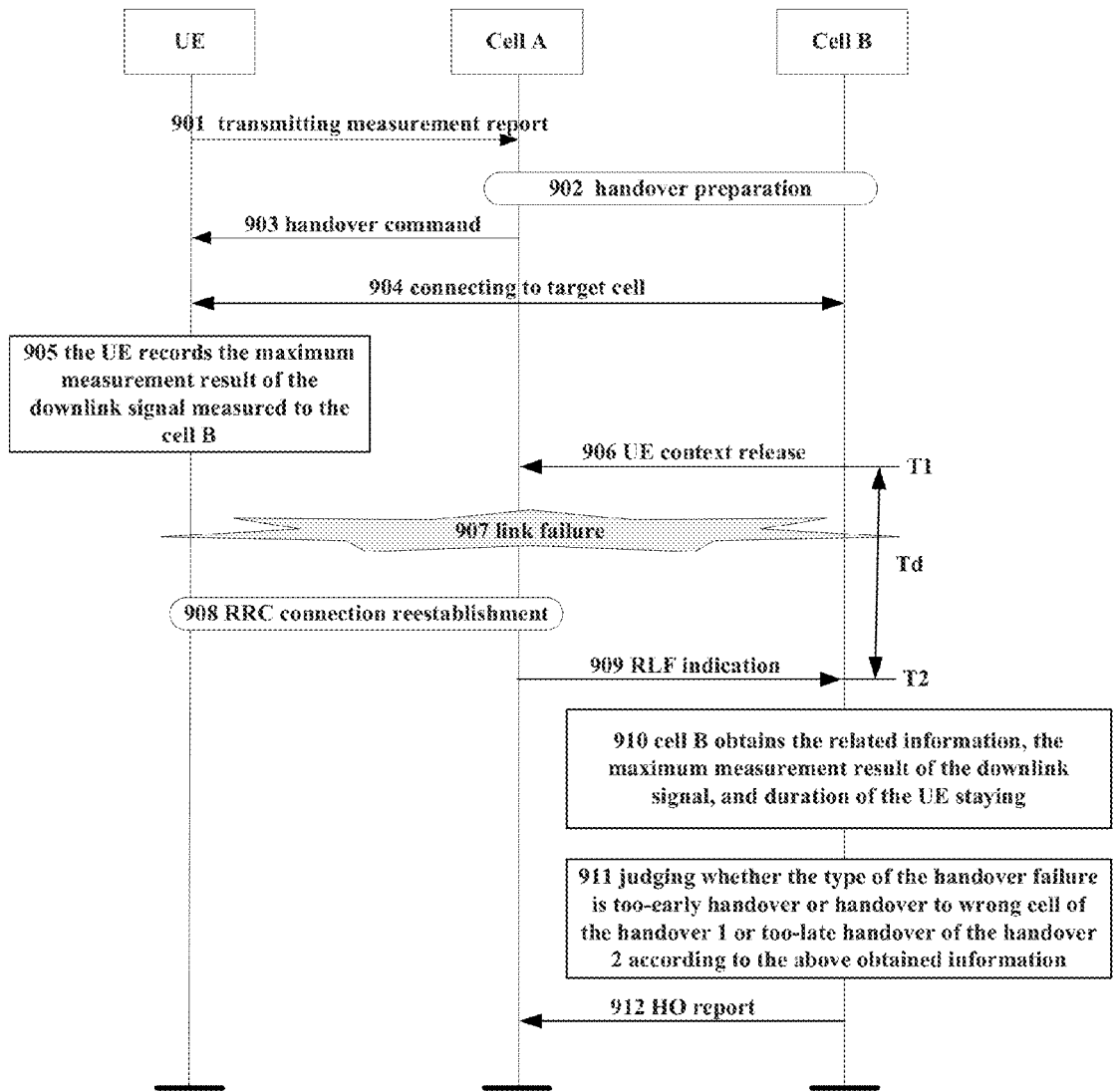
FIG. 9 is a flowchart of a method for judging type of a handover failure of Embodiment 5 of the present disclosure.

FIG. 9 is a flowchart of a method for judging type of a handover failure of Embodiment 5 of the present disclosure. As shown in FIG. 9, the method includes:

steps 901-904: UE is handed over successfully from the cell A to the cell B;

wherein, the handover procedure is similar to that in the prior art, which shall not be described herein any further, and the handover of this time is referred to as handover 1;

hence, the cell B is a target cell B of the UE, and at this moment, the serving cell is the cell B;

step 905: the UE records the maximum measurement result of the downlink signal measured to the serving cell during staying in the cell B;

for example, the maximum measurement result of the downlink signal may be RSRP or RSRQ;

step 906: a base station of the cell B notifies the cell A to release UE context information (UE context release), and the cell B starts a timer to begin timing, this moment being referred to as T1;

step 907: in the scenario shown in FIG. 3, as the coverage of the cell B is relatively small, after the UE is handed over to the cell B, the UE is possibly handed over from the cell B to the cell A after a period of time; if the moving speed of the UE is relatively fast and the handover is not in time, an RLF will occur in the UE when the UE is handed over from the cell B back to the cell A (the handover of this time is referred to as handover 2); and at this moment, the cell B is the link failure cell, and the cell A is the cell successfully transmitting a handover command to the UE in the latest time before the link fails, which is herein referred to as a source cell;

step 908: after a radio link failure (RLF) occurs, the UE initiates reestablishment connection to the cell A and transmits the related information, such as an UE identifier and an identifier of the cell B where the UE is present when the link fails (the link failure cell) to the cell A in the reestablishment connection procedure, and at the same time, the UE may transmit the maximum measurement result of the downlink signal recorded during staying in the cell B to the cell A;

wherein, the above related information and the maximum measurement result of the downlink signal may be transmitted via a connection reestablishment request (an RRC connection reestablishment request) message or a UE information response message; and the connection reestablishment procedure shall be described below with reference to FIG. 11;

furthermore, the maximum measurement result of the downlink signal may also be separately transmitted to the cell A via other messages;

step 909: after the UE reestablishes connection with the cell A, the cell A transmits an RLF indication message to the cell B according to the identifier of the cell B where the UE is present when the link failure occurs reported by the UE, the message including the above related information and the maximum measurement result of the downlink signal;

step 910: after receiving the RLF indication message, the base station of the cell B may obtain information contained therein, and the timer of the cell B is stopped; this moment is referred to as T2; and in this way, the base station B of the cell B may further obtain duration Td of the UE staying in the cell B, that is, Td=T2−T1;

step 911: the base station of the cell B judges whether the type of the handover failure is too-early handover or handover to wrong cell of the handover 1 or too-late handover of the handover 2 according to the above obtained information;

in this embodiment, as shown in FIG. 9, the detailed judgment is as follows:

1) when the duration Td of the UE staying in the cell B (the serving cell) is less than a first predefined value (such as Tstore_UE_cntxt), the reestablished cell to which the UE reestablishes is the cell successfully transmitting a handover command to the UE in the latest time before the connection fails (the source cell A), and the maximum measurement result of the downlink signal is less than a second predefined value Th, the type of the handover failure is too-early handover of the handover 1;

2) when the duration of the UE staying in the cell B (the serving cell) is less than a first predefined value (such as Tstore_UE_cntxt), the reestablished target cell is the cell successfully transmitting a handover command to the UE in the latest time before the connection fails (the source cell A), and the maximum measurement result of the downlink signal is greater than a second predefined value Th, the type of the handover failure is too-late handover of the handover 2;

in this embodiment, as the reestablished cell of the connection reestablishment is the source cell, it is not the case of handover to wrong cell;

step 912: when the judgment result in step 911 is too-early handover, the connection failure cell (the cell B) transmits a handover report (HO report) message to the cell A informing that too-early handover occurs.

For the scenario shown in FIG. 3, whether the link failure is resulted from too-early handover of the handover 1 or too-late handover of the handover 2 cannot be judged accurately according to an existing judgment mechanism, while such a problem may be solved by the embodiment of the present disclosure.

With reference to the scenario shown in FIG. 4, when the UE is handed over from the cell A to the cell B (handover 1) and the moving speed of the UE is relatively fast, as the coverage of the cell B is relatively small, the UE possibly needs to be handed over from the cell B to a cell C (handover 2) in a short period of time. If the handover is not in time, a link failure will occur. For such a scenario, whether the link failure is resulted from handover to wrong cell of the handover 1 or too-late handover of the handover 2 cannot be judged accurately according to an existing judgment mechanism, while such a problem may be solved by Embodiment 6 of the present disclosure.

Figure 10:
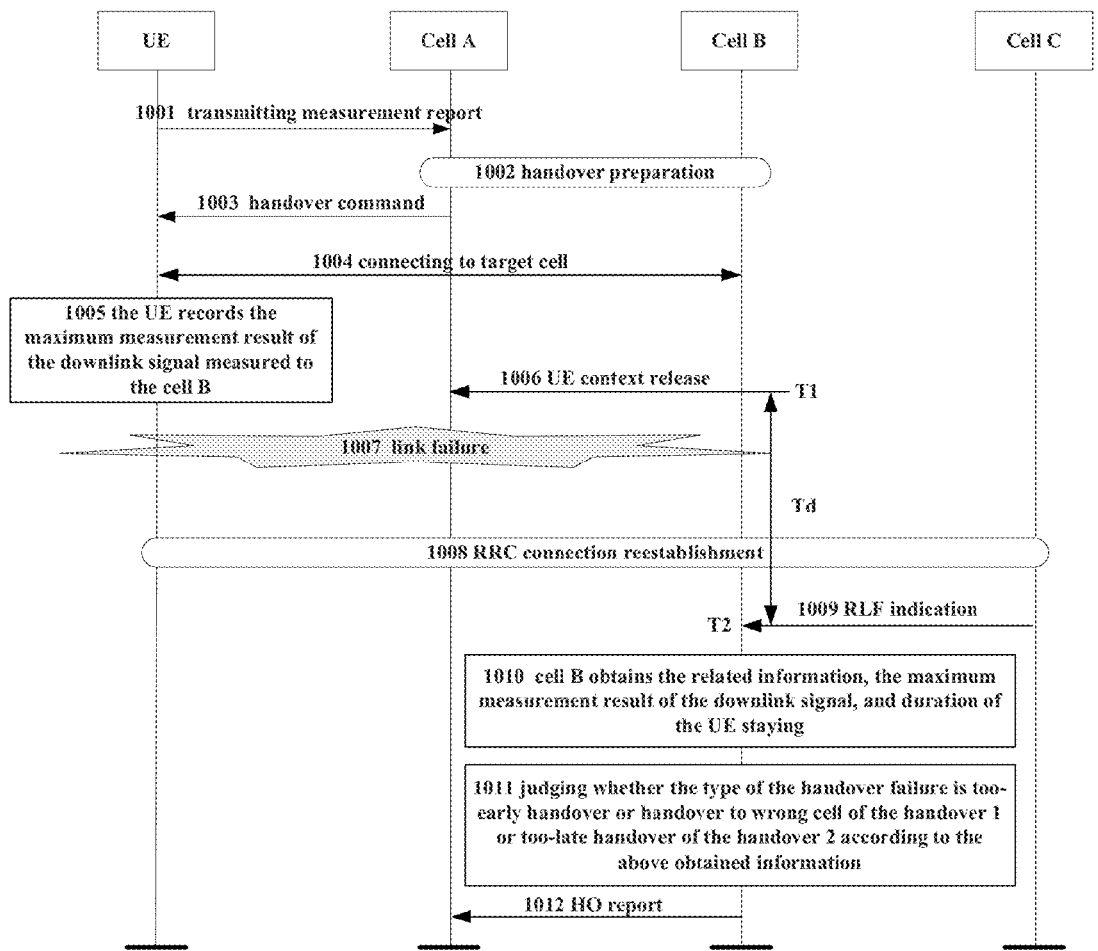
FIG. 10 is a flowchart of a method for judging type of a handover failure of Embodiment 6 of the present disclosure.
Figure 11:
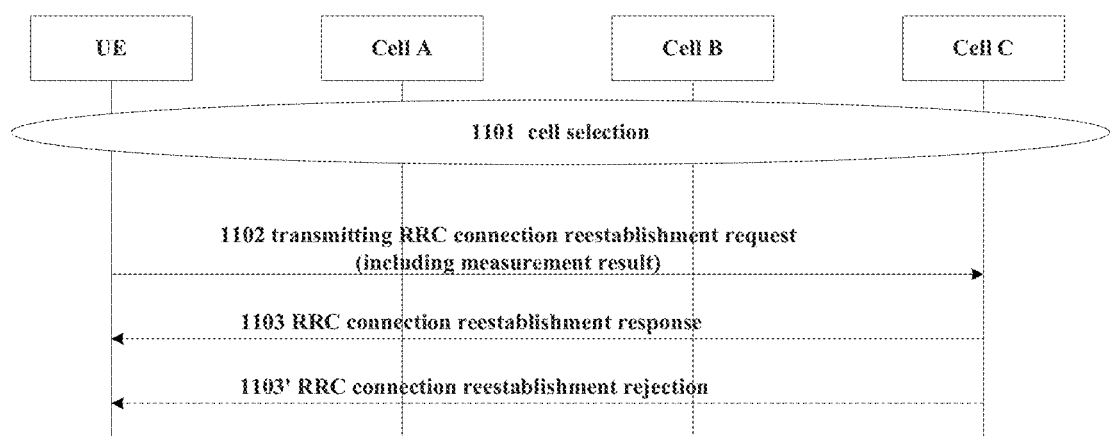
FIG. 11 is a flowchart of a connection reestablishment procedure between UE and a cell.

FIG. 10 is a flowchart of a method for judging type of a handover failure of Embodiment 6 of the present disclosure. As shown in FIG. 10, the method includes:

steps 1001-1004: the UE is handed over successfully from the cell A to the cell B;

wherein, the handover procedure is similar to that in the prior art, which shall not be described herein any further, and the handover of this time is referred to as handover 1;

hence, the serving cell is the cell B;

step 1005: the UE records the maximum measurement result of the downlink signal measured to the serving cell during staying in the cell B;

for example, the maximum measurement result of the downlink signal may be RSRP or RSRQ;

step 1006: the base station of cell B notifies the cell A to release UE context information (UE context release), and the cell B starts a timer to begin timing, this moment being referred to as T1;

step 1007: in the scenario shown in FIG. 4, as the coverage of the cell B is relatively small, after the UE is handed over to the cell B, the UE is possibly handed over from the cell B to a cell C after a period of time; if the moving speed of the UE is relatively fast and the handover is not in time, an RLF will occur in the UE when the UE is handed over from the cell B to the cell C (the handover of this time is referred to as handover 2); and here the cell B is the link failure cell, and the cell A is the cell successfully transmitting a handover command to the UE in the latest time before the link fails, such as a source cell;

step 1008: after the radio link failure (RLF) occurs, the UE initiates reestablishment connection to the cell C and transmits the related information, such as an UE identifier and an identifier of the cell B where the UE is present when the link failure occurs (referred to as link failure cell) to the cell C in the reestablishment connection procedure, and at the same time, the UE may transmit the maximum measurement result of the downlink signal recorded during staying in the cell B to the cell C;

wherein, the above related information and the maximum measurement result of the downlink signal may be transmitted via a connection reestablishment request (RRC connection reestablishment request) message or a UE information response message; and the connection reestablishment procedure is similar to that in Embodiment 5 and may refer to FIG. 11, which shall not be described herein any further;

furthermore, the maximum measurement result of the downlink signal may also be separately transmitted to the cell C via other messages;

step 1009: after the UE reestablishes connection with the cell C, the cell C transmits an RLF indication message to the cell B according to the identifier of the cell B where the UE is present when the link failure occurs reported by the UE, the message including the above related information and the maximum measurement result of the downlink signal;

step 1010: after receiving the RLF indication message, the base station of the cell B may obtain information contained therein, and the timer of the cell B is stopped; this moment is referred to as T2; and in this way, the base station B of the cell B may further obtain duration Td of the UE staying in the cell B, that is, Td=T2−T1;

step 1011: the base station of the cell B judges whether the type of the handover failure is too-early handover or handover to wrong cell of the handover 1 or too-late handover of the handover 2 according to the above obtained information;

in this embodiment, the detailed judgment is as follows:

1) when the duration Td of the UE staying in the serving cell (the cell B) is less than a first predefined value, the reestablished cell to which the UE attempts to reestablish is not the cell successfully transmitting a handover command to the UE in the latest time before the connection fails (the cell A) and a target cell (the cell B), and the maximum measurement result of the downlink signal is less than a second predefined value Th, the type of the handover failure is handover to wrong cell of the handover 1;

2) when the duration of the UE staying in the serving cell is less than a first predefined value, the reestablished cell to which the UE reestablish is not the cell successfully transmitting a handover command to the UE in the latest time before the connection fails (the cell A) and a target cell (the cell B), and the maximum measurement result of the downlink signal is greater than a second predefined value, the type of the handover failure is too-late handover of the handover 2;

in scenario shown in FIG. 10, as the reestablished cell of the connection reestablishment is not the source cell A, the handover 1 is not too-early handover;

step 1012: when the judgment result in step 1011 is handover to wrong cell, the connection failure cell (the cell B) transmits a handover report (HO report) message to the cell A of handover 1 informing that handover to wrong cell occurs.

For the scenario shown in FIG. 4, whether the link failure is resulted from handover to wrong cell of the handover 1 or too-late handover of the handover 2 cannot be judged accurately according to an existing judgment mechanism, while such a problem may be solved by the embodiment of the present disclosure.

FIG. 11 is a flowchart of a connection reestablishment procedure between UE and a cell. The cell reestablishment procedure is similar to that in the prior art, with the exception that when the UE transmits a request message to the reestablished cell, the maximum measurement result of the downlink signal is also reported to the reestablished cell. Brief description shall be given below with reference to FIG. 11. As shown in FIG. 11, the method includes:

step 1101: the UE performs cell selection;

wherein, the selection process is as described in the prior art, which shall not be described herein any further;

step 1102: if a cell A is selected by the UE in step 1101, the UE transmits an RRC connection reestablishment request message to the cell A; wherein, the request message may include related information, such as an UE identifier and an identifier of the cell where the link failure occurs (the identifier of cell B), and may further include the maximum measurement result of the downlink signal; and step 1103: the cell A feeds back an RRC connection reestablishment response message for receiving the reestablishment request, such that the UE reestablishes connection to the cell A.

Figure 12:
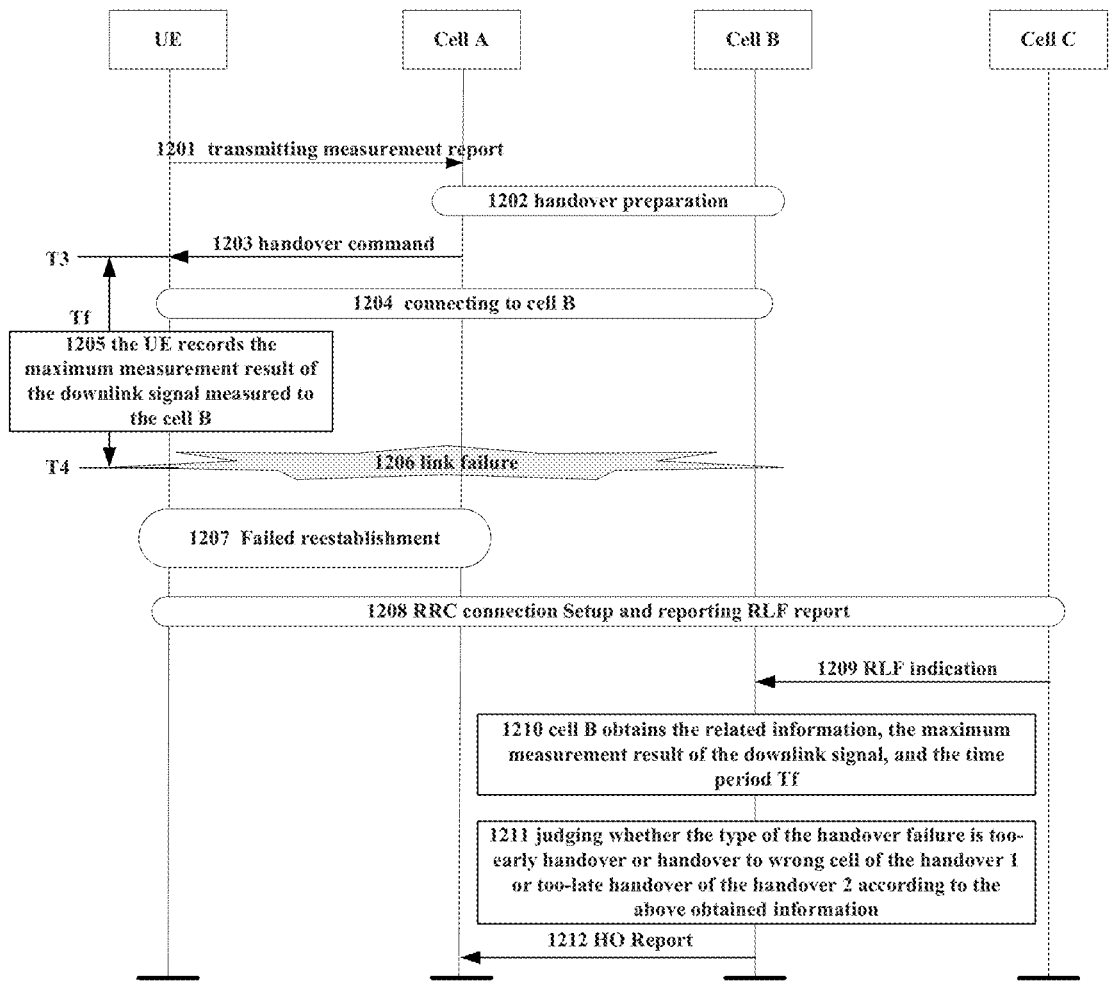
FIG. 12 is a flowchart of a method for judging type of a handover failure of Embodiment 7 of the present disclosure.
Figure 14:
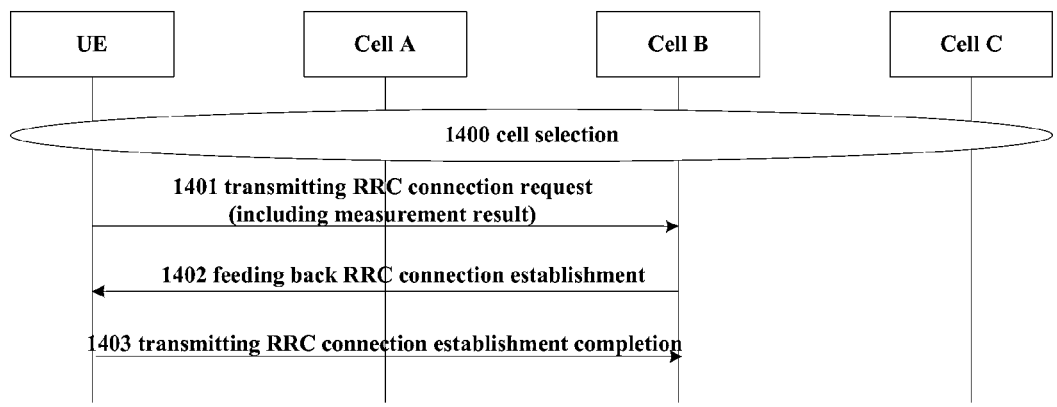
FIG. 14 is a flowchart of a procedure of establishing RRC connection between UE and a cell.

FIG. 12 is a flowchart of a method for judging type of a handover failure of Embodiment 7 of the present disclosure. With reference to the scenario shown in FIG. 3, it differs from Embodiment 5 in that after the link failure occurs in the UE, a connection reestablishment attempt is performed but the reestablishment fails, the UE initiates a new connection establishment procedure to establish connection with the target cell. As shown in FIG. 12, the method includes:

steps 1201-1204: the UE is handed successfully from the cell A to the cell B;

wherein, the handover procedure is similar to that in the prior art, which shall not be described herein any further, and the handover of this time is referred to as handover 1;

hence, the cell B is a target cell B of the UE, and at this moment, the serving cell is the cell B;

step 1205: the UE records the maximum measurement result of the downlink signal measured to the serving cell during staying in the cell B;

for example, the maximum measurement result of the downlink signal may be RSRP or RSRQ;

step 1206: in the scenario shown in FIG. 3, as the coverage of the cell B is relatively small, after the UE is handed over to the cell B, the UE is possibly handed over from the cell B to the cell A after a short period of time; if the moving speed of the UE is relatively fast and the handover is not in time, an RLF will occur in the UE when the UE is handed over from the cell B back to the cell A (the handover of this time is referred to as handover 2); and at this moment, the cell B is the link failure cell, and the cell A is the cell successfully transmitting a handover command to the UE in the latest time before the link fails, such as a source cell;

when the link failure occurs, the UE may obtain a time period (Tf) experienced by the UE from receiving a handover command message for the last time (moment T3) to the occurrence of the link failure (moment T4) by timing by a timer;

steps 1207-1208: after the radio link failure (RLF) occurs, the UE initiates a reestablishment connection attempt to the cell A and the reestablishment attempt fails, then the UE initiates a new RRC connection establishment procedure to the cell C (which may also be other cells after the reselection) via cell reselection procedure, the procedure being as shown in FIG. 14, and the UE report an RLF report to the cell C (the newly-established cell); wherein, the RLF report may include related information, such as an UE identifier, an identifier of the cell B where the link failure occurs (the link failure cell), and the time period Tf, and may further include the maximum measurement result of the downlink signal;

furthermore, the maximum measurement result of the downlink signal may also be separately transmitted to the cell C via other messages;

step 1209: after the UE establishes connection with the cell C, the cell C transmits an RLF indication message to the cell B according to the identifier of the cell B where the UE is present when the link failure occurs reported by the UE, the message including the above related information and the maximum measurement result of the downlink signal;

step 1210: after receiving the RLF indication message, the base station of the cell B may obtain information contained therein;

step 1211: the base station of the cell B judges whether the type of the handover failure is too-early handover or handover to wrong cell of the handover 1 or too-late handover of the handover 2 according to the above obtained information;

in this embodiment, as shown in FIG. 12, the detailed judgment is as follows:

1) when the time period Tf experienced by the UE from receiving a handover command message for the last time (moment T3) to the occurrence of connection failure (moment T4) is less than a third predefined value (such as Tstore_UE_cntxt'), the reestablished cell of the UE is the cell successfully transmitting a handover command to the UE in the latest time before the connection fails (the cell A), and the maximum measurement result of the downlink signal is less than a fourth predefined value Th', the type of the handover failure is too-early handover of the handover 1;

2) when the time period Tf experienced by the UE from receiving a handover command message for the last time (moment T3) to the occurrence of connection failure (moment T4) is less than a third predefined value (such as Tstore_UE_cntxt'), the reestablished cell of the UE is the cell successfully transmitting a handover command to the UE in the latest time before the connection fails (the cell A), and the maximum measurement result of the downlink signal is greater than a fourth predefined value Th', the type of the handover failure is too-late handover of the handover 2;

in this embodiment, as the reestablished cell is not the cell successfully transmitting a handover command to the UE in the latest time before the connection fails (the cell A) and the target cell (the cell B), it is not the case of handover to wrong cell;

step 1212: if the judgment result in step 1211 is too-early handover, the connection failure cell (the cell B) transmits a handover report (HO report) message to the cell A informing that too-early handover occurs.

For the scenario shown in FIG. 3, whether the link failure is resulted from too-early handover of the handover 1 or too-late handover of the handover 2 can not be judged according to an existing judgment mechanism, while such a problem may be solved by the embodiment of the present disclosure.

Figure 13:
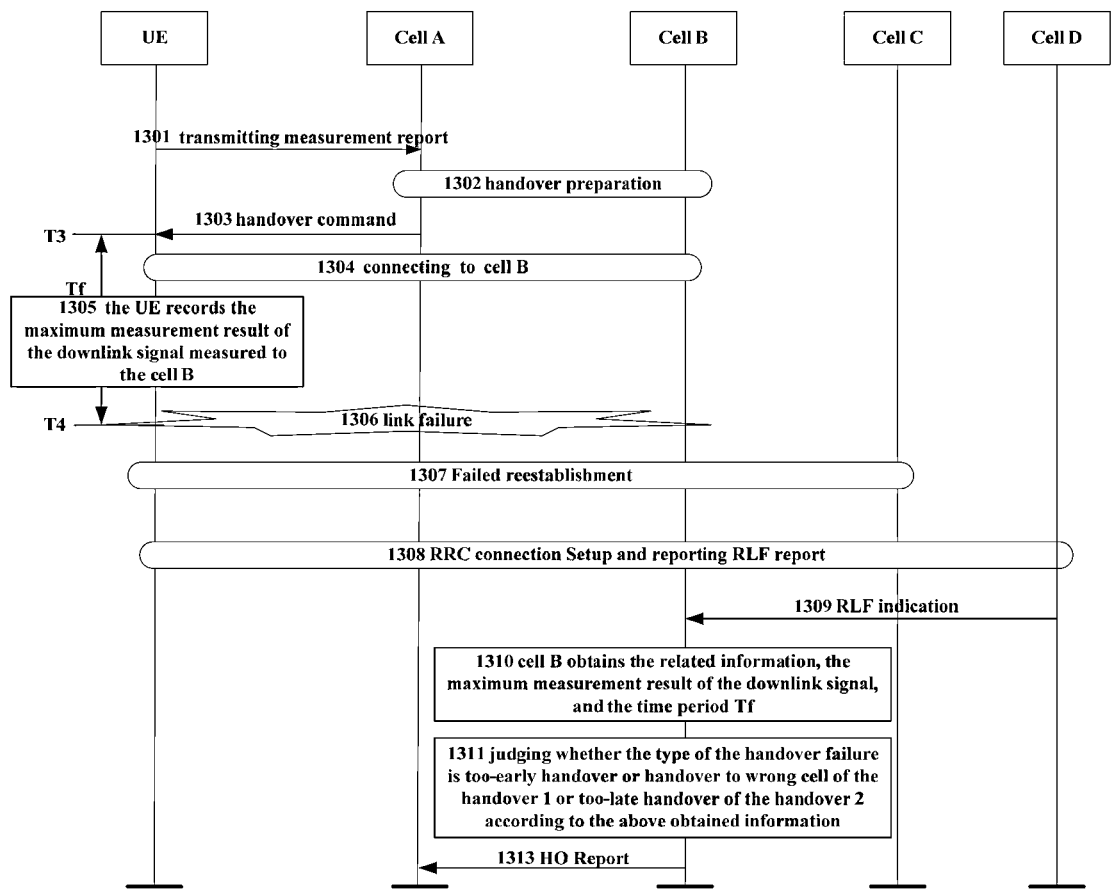
FIG. 13 is a flowchart of a method for judging type of a handover failure of Embodiment 8 of the present disclosure.

FIG. 13 is a flowchart of a method for judging type of a handover failure of Embodiment 8 of the present disclosure. With reference to the scenario shown in FIG. 4, it differs from Embodiment 6 in that after the link failure occurs in the UE, a connection reestablishment attempt is performed but the reestablishment fails, the UE initiates a new connection establishment procedure to establish connection with the target cell. As shown in FIG. 13, the method includes:

steps 1301-1305: similar to Embodiment 7, and shall not be described herein any further;

step 1306: in the scenario shown in FIG. 4, as the coverage of the cell B is relatively small, after the UE is handed over to the cell B, the UE is possibly handed over from the cell B to a cell C after a short period of time; if the moving speed of the UE is relatively fast and the handover is not in time, an RLF will occur in the UE when the UE is handed over from the cell B to the cell C (the handover of this time is referred to as handover 2); and at this moment, the cell B is the link failure cell, and the cell A is the cell successfully transmitting a handover command to the UE in the latest time, such as a source cell;

when the link failure occurs, the UE may obtain a time period (Tf) experienced by the UE from receiving a handover command message for the last time (moment T3) to the occurrence of the link failure (moment T4) by timing by a timer;

steps 1307-1308: similar to steps 1207-1208 in Embodiment 7, and shall not be described herein any further;

in this way, with step 1308, the cell D (a newly-established cell) may obtain related information and the maximum measurement result of the downlink signal;

step 1309: after the UE establishes connection with the cell D, the cell A transmits an RLF indication message to the cell B according to the identifier of the cell B where the UE is present when the link failure occurs reported by the UE, the message including the above related information and the maximum measurement result of the downlink signal;

step 1310: after receiving the RLF indication message, the cell B may obtain information contained therein;

step 1311: the cell B judges whether the type of the handover failure is too-early handover or handover to wrong cell of the handover 1 or too-late handover of the handover 2 according to the above obtained information;

in this embodiment, as shown in FIG. 12, the detailed judgment is as follows:

1) when the time period Tf (timeConnFailure) experienced by the UE from receiving a handover command message for the last time (moment T3) to the occurrence of link failure (moment T4) is less than a third predefined value (such as Tstore_UE_cntxt'), the reestablished cell of the UE is not the cell successfully transmitting a handover command to the UE in the latest time before the connection fails (the cell A) and the target cell (the cell B), and the maximum measurement result of the downlink signal is less than a fourth predefined value Th', the type of the handover failure is handover to wrong cell of the handover 1;

2) when the time period Tf experienced by the UE from receiving a handover command message for the last time (moment T3) to the occurrence of link failure (moment T4) is less than a third predefined value (such as Tstore_UE_cntxt'), the reestablished cell of the UE is not the cell successfully transmitting a handover command to the UE in the latest time before the connection fails (the cell A) or the target cell (the cell B), and the maximum measurement result of the downlink signal is less than a fourth predefined value Th', the type of the handover failure is too-late handover of the handover 2;

For the scenario shown in FIG. 4, whether the link failure is resulted from handover to wrong cell of the handover 1 or too-late handover of the handover 2 cannot be judged according to an existing judgment mechanism, while such a problem may be solved by Embodiment 8 of the present disclosure.

FIG. 14 is a flowchart of a establishing RRC connection procedure between UE and a cell. This procedure is similar to that in the prior art, with the exception that the UE further needs to report the measured maximum measurement result of the downlink signal when it stays in the serving cell B. As shown in FIG. 14, the method includes:

step 1400: performing cell selection;

wherein, the selection process is as described in the prior art, which shall not be described herein any further;

step 1401: the UE transmits RRC connection request to selected cell C, the request may include related information described in embodiments 7 and 8, and may also include the measured maximum measurement result of the downlink signal;

step 1402: after receiving the RRC connection request, the cell C feeds back an RRC connection establishment message to the UE; and step 1403: after receiving the RRC connection establishment message, the UE transmits an RRC connection establishment completion message to the cell C, so that connection between the UE and the cell C is established successfully.

Furthermore, as described above, in the case of newly establishing connection, the UE may report the related information of the connection failure event to the network side in a manner of UE information request (a request at the network side) and UE information response (transmitted by the UE), and report the measurement result while reporting the related information, which shall not be described herein any further.

A person of ordinary skill in the art may understand that all or part of the steps in the method carrying out the above embodiment may be carried out by related hardware instructed by a program. The program may be stored in a computer-readable storage medium. And when being executed, the program may include all or part of the steps in the method of the above embodiment, and the storage medium may include an ROM, an RAM, a floppy disc, and a compact disc, etc.

Embodiment of the present disclosure further provides an apparatus for judging type of a handover failure and UE, as described in the embodiments below. As the principles of the apparatus and the UE for solving problems are similar to those of the above method for judging type of a handover failure based on an apparatus and UE, the implementation of the method may be referred to for the implementation of the apparatus and the UE, and the repeated parts shall not be described any further.

Figure 15:
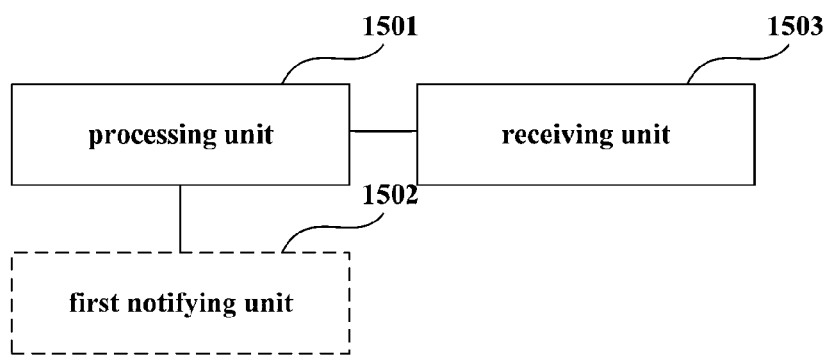
FIG. 15 is a schematic diagram of the structure of an apparatus for judging type of a handover failure of Embodiment 9 of the present disclosure.

FIG. 15 is a schematic diagram of the structure of an apparatus for judging type of a handover failure of Embodiment 9 of the present disclosure. As shown in FIG. 15, the apparatus includes a processing unit 1501, the processing unit 1501 is configured to judge type of a handover failure according to a maximum measurement result of a downlink signal obtained from a network side and measured by UE at a serving cell where the UE is present before connection fails and related information.

In this embodiment, as described in the above embodiments, the related information includes: duration of the UE staying in the serving cell or a time period experienced by the UE from receiving a handover command message for the last time to the occurrence of connection failure, and a cell identifier of a cell which successfully transmits a handover command to the UE in the latest time before the connection fails, a target cell identifier and a reestablished cell identifier.

As shown in FIG. 15, the apparatus further includes a first notifying unit 1502, the first notifying unit 1502 is configured to, when the type of the handover failure judged by the processing unit 1501 is the handover to wrong cell or the too-early handover of the latest handover before the connection fails, notify the type of the handover failure to the cell successfully transmitting a handover command to the UE in the latest time before the connection fails, which is an optional component.

As shown in FIG. 15, the apparatus further includes a receiving unit 1503, the receiving unit 1503 is configured to receive the maximum measurement result of the downlink signal notified by a network side, after the connection failure occurs in the UE, for use by the processing unit 1501 in judging type of a handover failure. Furthermore, the receiving unit 1503 further receives other information transmitted by the UE, the information being similar to that in the prior art, and shall not be described herein any further.

Figure 16:
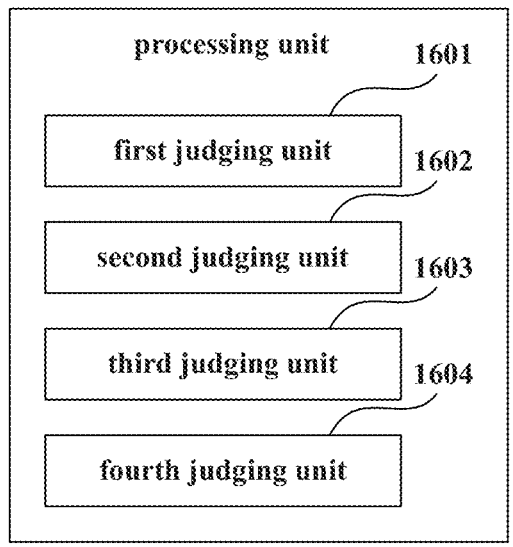
FIG. 16 is a schematic diagram of the structure of a processing unit of Embodiment 9 of the present disclosure.

FIG. 16 is a schematic diagram of the structure of the processing unit of Embodiment 9 of the present disclosure. As shown in FIG. 16, when connection fails and the UE restores connection through connection reestablishment, the processing unit 1501 includes:

a first judging unit 1601 configured to, when the duration of the UE staying in the serving cell is less than a first predefined value, the reestablished cell to which the UE attempts to reestablish is the cell successfully transmitting a handover command to the UE in the latest time before the connection fails, and the maximum measurement result of the downlink signal is less than a second predefined value, judge that the type of the handover failure is too-early handover of the latest handover before the connection fails;

a second judging unit 1602 configured to, when the duration of the UE staying in the serving cell is less than a first predefined value, the reestablished cell to which the UE attempts to reestablish is the cell successfully transmitting a handover command to the UE in the latest time before the connection fails, and the maximum measurement result of the downlink signal is greater than a second predefined value, judge that the type of the handover failure is too-late handover of handover from the serving cell to the reestablished cell;

a third judging unit 1603 configured to, when the duration of the UE staying in the serving cell is less than a first predefined value, the reestablished cell to which the UE attempts to reestablish is not a target cell or the cell successfully transmitting a handover command to the UE in the latest time before the connection fails, and the maximum measurement result of the downlink signal is less than a second predefined value, judge that the type of the handover failure is handover to wrong cell of the latest handover before the connection fails; and a fourth judging unit 1604 configured to, when the duration of the UE staying in the serving cell is less than a first predefined value, the reestablished cell to which the UE attempts to reestablish is not the target cell or the cell successfully transmitting a handover command to the UE in the latest time before the connection fails, and the maximum measurement result of the downlink signal is greater than a second predefined value, judge that the type of the handover failure is too-late handover of handover from the serving cell to the reestablished cell.

Figure 17:
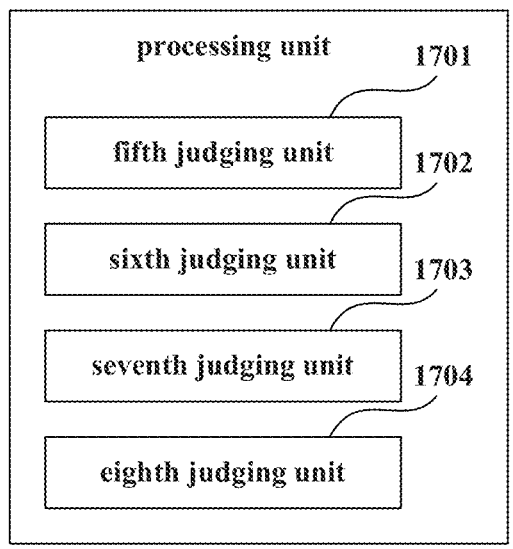
FIG. 17 is a schematic diagram of the structure of a processing unit of Embodiment 9 of the present disclosure.

FIG. 17 is a schematic diagram of the structure of the processing unit of Embodiment 9 of the present disclosure. As shown in FIG. 17, when connection fails, an attempt of connection reestablishment fails, and the UE initiates a new connection establishment procedure to the network side, the processing unit 1501 includes:

a fifth judging unit 1701 configured to, when the time period experienced by the UE from receiving a handover command message for the last time to the occurrence of connection failure is less than a third predefined value, the reestablished cell of the UE is the cell successfully transmitting a handover command to the UE in the latest time before the connection fails, and the maximum measurement result of the downlink signal is less than a fourth predefined value, judge that the type of the handover failure is too-early handover of the latest handover before the connection fails;

a sixth judging unit 1702 configured to, when the time period experienced by the UE from receiving a handover command message for the last time to the occurrence of connection failure is less than a third predefined value, the reestablished cell of the UE is the cell successfully transmitting a handover command to the UE in the latest time before the connection fails, and the maximum measurement result of the downlink signal is greater than a fourth predefined value, judge that the type of the handover failure is too-late handover of a handover from the serving cell to the reestablished cell;

a seventh judging unit 1703 configured to, when the time period experience by the UE from receiving a handover command message for the last time to the occurrence of connection failure is less than a third predefined value, the reestablished cell of the UE is not the target cell or the cell successfully transmitting a handover command to the UE in the latest time before the connection fails, and the maximum measurement result of the downlink signal is less than a fourth predefined value, judge that the type of the handover failure is handover to wrong cell of the latest handover before the connection fails; and an eighth judging unit 1704 configured to, when the time period experienced by the UE from receiving a handover command message for the last time to the occurrence of connection failure is less than a third predefined value, the reestablished cell of the UE is not the target cell or the cell successfully transmitting a handover command to the UE in the latest time before the connection fails, and the maximum measurement result of the downlink signal is greater than a fourth predefined value, judge that the type of the handover failure is too-late handover of handover from the serving cell to the reestablished cell.

In this embodiment, the apparatus may be a network side entity, corresponding to a last serving cell of the UE before the link failure occurs (such as the entities in the cell B in embodiments 5-8); for example, the apparatus may be a base station, with an operational flow being similar to those in embodiments 1 and 4, which shall not be described herein any further.

Figure 18:
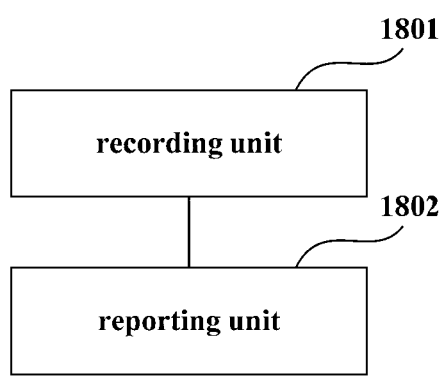
FIG. 18 is a schematic diagram of the structure of UE of Embodiment 10 of the present disclosure.

FIG. 18 is a schematic diagram of the structure of UE of Embodiment 10 of the present disclosure. As shown in FIG. 18, the UE includes: a recording unit 1801 and a reporting unit 1802; wherein, the recording unit 1801 is configured to record a maximum measurement result of a downlink signal measured by the UE at a serving cell;

and the reporting unit 1802 is configured to report the maximum measurement result of the downlink signal to a network side after a connection failure occurs in the UE.

In this embodiment, the UE may further include a judging unit configured to judge whether the serving cell is a relatively small cell; and inform the recording unit 1801 to record the maximum measurement result of the downlink signal measured at the serving cell when the judgment result is yes.

In this embodiment, the UE may be any terminal equipment, such as a mobile phone, a PDA, and a computer, etc., with an operational flow being similar to those in embodiments 2 and 4, which shall not be described herein any further.

The apparatus for judging type of handover failure of Embodiment 11 of the present disclosure includes: a second receiving unit and a second notifying unit; wherein, the second receiving unit is configured to, after a connection failure occurs in UE, receive a maximum measurement result of a downlink signal reported by the UE and measured by the UE at a serving cell where the UE is present before the connection fails; and a second notifying unit is configured to report the maximum measurement result of the downlink signal to the serving cell where the UE is present before the connection fails, so that the serving cell judges type of the handover failure by using the maximum measurement result of the downlink signal.

In this embodiment, the apparatus may be a network side functional entity, corresponding to a reestablished cell to which the UE reestablishes or a newly-established cell to which connection is newly established after the link fails, such as a base station of a corresponding cell, with an operational flow being similar to those in embodiments 3 and 4, which shall not be described herein any further.

It can be seen from the above embodiment that the UE reports the measured maximum measurement result of the downlink signal of the serving cell to a network side, so that network side reports the information to the serving cell where the UE is present before the connection fails (a connection failure cell), such that the connection failure cell may accurately judges the handover failure by using the maximum measurement result of the downlink signal.

Embodiment 12 of the present disclosure further provides a method for configuring a handover parameter, including: configuring a handover parameter or a reference range of a handover parameter according to related information, the related information being one or more pieces of the following information: a size of a cell, a type of a cell, a speed of UE, and a manner for restoring connection to the UE.

In this embodiment, the handover parameter may be a time-related threshold value, such as a time-related parameter Tstore_UE_cntxt, or other threshold values related to the MRO handover failure judgment mechanism.

Furthermore, the above time-related threshold values may be at least two time threshold values, one is used in an MRO handover failure judgment mechanism after the UE initiates an RRC connection reestablishment, and the other is used in an MRO handover failure judgment mechanism after the UE initiates a new RRC connection establishment procedure. And the existed problems are solved by reasonably configuring the above handover parameters.

In this embodiment, the above configuring process is carries out via an OAM; however, it is not limited thereto, and other entities at the network side may be used to carry out the above configuring process.

In this embodiment, configuring the handover parameters also includes configuring a range of the handover parameters. In directly configuring the time threshold parameters (such as Tstore_UE_cntxt, or other threshold values related to the MRO handover failure judgment mechanism), or in configuring a range of the time threshold parameters, one or more pieces of the following information may be taken into account: a size of a cell, a type of a cell (expanding coverage, and raising capacity), a speed of the UE, and a manner of restoring RRC connection by the UE after connection fails; however, it is not limited thereto.

Following description is given by way of examples.

1) A Speed of the UE

Configuring a smaller time threshold value parameter (such as Tstore_UE_cntxt, or other threshold values related to the MRO handover failure judgment mechanism) for the UE of relatively large speed (for example, the speed of the UE is greater than a certain threshold value); wherein, the threshold value is usually set by an operator according to particular network deployment.

In this embodiment, the range of the handover parameter may be set. If a moving state of the UE is "high", a corresponding setting range of time threshold parameter may be (0~51.1 s); if a moving state of the UE is "intermediate", a corresponding setting range of time threshold parameter may be (25.5 s~76.6 s); and if a moving state of the UE is "low", a corresponding setting range of time threshold parameter may be (51.1 s~102.3 s).

2) A Size of a Cell

Configuring a larger time threshold parameter for a cell of relatively large coverage (such as a usual macro base station); and configuring a smaller time threshold parameter for a cell of relatively small coverage (such as a pico or a femto).

For example, for a macro base station, a setting range of time threshold parameter may be (0~102.3 s); and for a small-sized base station, such as a pico base station, an RRH (remote radio head), a femto or a relay base station, a setting range of time threshold parameter may be (0~51.1 s).

3) A Type of a Cell

If a cell is used to expand coverage, the handover parameter, such as Tstore_UE_cntxt, may be set as a smaller value; and if a cell is used to raise capacity, the handover parameter, such as Tstore_UE_cntxt, may be set as a larger value.

For example, for a cell for expanding coverage, a setting range of time threshold parameter may be (0~102.3 s); and for a cell for raising capacity, a setting range of time threshold parameter may be (0~51.1 s).

4) a Manner of Restoring RRC Connection by the UE

Different time threshold parameter values are configured for two cases where the UE restores failed connection via an RRC reestablishment procedure or an RRC connection establishment procedure.

For example, for the case where the UE restores failed connection via an RRC reestablishment procedure, a setting range of time threshold parameter may be (0~51.1 s); and for the case where the UE restores failed connection via an RRC connection establishment procedure, a setting range of time threshold parameter may be (0~102.3 s).

Furthermore, in configuring the handover parameter, the above information may be comprehensively taken into account according to an actual situation, so as to reasonably configure the handover parameters.

Embodiment 13 of the present disclosure further provides an apparatus for configuring a handover parameter, including: a configuring unit configured to configure a handover parameter or a reference range of a handover parameter according to related information, the related information being one or more pieces of the following information: a size of a cell, a type of a cell, a speed of UE, and a manner for restoring connection to the UE; wherein, a particular configuring manner of the configuring unit is as described in Embodiment 12, which shall not be described herein any further.

The apparatus may be an OAM at the network side; however, it is not limited thereto, and it may also be other entities at the network side.

An embodiment of the present disclosure further provides a computer-readable program, wherein when the program is executed in an apparatus for judging type of a handover failure, the program enables a computer to carry out the method for judging type of a handover failure as described in embodiments 1 and 3-8 in the apparatus for judging type of a handover failure.

An embodiment of the present disclosure further provides a storage medium in which a computer-readable program is stored, wherein the computer-readable program enables a computer to carry out the method for judging type of a handover failure as described in embodiments 1 and 3-8 in an apparatus for judging type of a handover failure.

An embodiment of the present disclosure further provides a computer-readable program, wherein when the program is executed in UE, the program enables a computer to carry out the method for judging type of a handover failure as described in embodiments 2 and 3-8 in the UE.

An embodiment of the present disclosure further provides a storage medium in which a computer-readable program is stored, wherein the computer-readable program enables a computer to carry out the method for judging type of a handover failure as described in embodiments 2 and 3-8 in UE.

An embodiment of the present disclosure further provides a computer-readable program, wherein when the program is executed in an apparatus for configuring a handover parameter, the program enables a computer to carry out the method for configuring a handover parameter as described in embodiment 12 in the apparatus for configuring a handover parameter.

An embodiment of the present disclosure further provides a storage medium in which a computer-readable program is stored, wherein the computer-readable program enables a computer to carry out the method for configuring a handover parameter as described in embodiment 12 in an apparatus for configuring a handover parameter.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. An apparatus for judging type of a handover failure, comprising:
a receiver and
a processing circuit coupled with the receiver and configured to judge type of a handover failure according to a maximum measurement result of a downlink signal obtained from a network side by the receiver and related information,
wherein, the maximum measurement result of a downlink signal is measured by User Equipment (UE) at a serving cell where the UE is present before connection fails,
the network side is a reestablished cell or a newly-established cell to which the UE is connected through reestablishment or new establishment after the connection fails.

2. The apparatus according to claim 1, wherein the related information comprises: duration of the UE staying in the serving cell or a time period experienced by the UE from receiving a handover command message for the last time to an occurrence of a connection failure, and a cell identifier of a cell which successfully transmits a handover command to the UE in the latest time before the connection fails, a target cell identifier and a reestablished cell identifier.

3. The apparatus according to claim 2, wherein the processing circuit is further configured to perform:
a first judging to, when the duration of the UE staying in the serving cell is less than a first predefined value, the reestablished cell to which the UE attempts to reestablish is the cell successfully transmitting a handover command to the UE in the latest time before the connection fails, and the maximum measurement result of the downlink signal is less than a second predefined value, judge that the type of the handover failure is too-early handover of the latest handover before the connection fails;

a second judging to, when the duration of the UE staying in the serving cell is less than the first predefined value, the reestablished cell to which the UE attempts to reestablish is the cell successfully transmitting a handover command to the UE in the latest time before the connection fails, and the maximum measurement result of the downlink signal is greater than the second predefined value, judge that the type of the handover failure is too-late handover of handover from the serving cell to the reestablished cell;

a third judging to, when the duration of the UE staying in the serving cell is less than the first predefined value, the reestablished cell to which the UE attempts to reestablish is not a target cell or the cell successfully transmitting a handover command to the UE in the latest time before the connection fails, and the maximum measurement result of the downlink signal is less than the second predefined value, judge that the type of the handover failure is handover to wrong cell of the latest handover before the connection fails; and a fourth judging to, when the duration of the UE staying in the serving cell is less than the first predefined value, the reestablished cell to which the UE attempts to reestablish is not the target cell or the cell successfully transmitting a handover command to the UE in the latest time before the connection fails, and the maximum measurement result of the downlink signal is greater than the second predefined value, judge that the type of the handover failure is too-late handover of handover from the serving cell to the reestablished cell.

4. The apparatus according to claim 3, wherein the apparatus further comprises: a first notifying circuit configured to, when the type of the handover failure judged by the processing circuit is the handover to wrong cell or the too-early handover of the latest handover before the connection fails, notify the type of the handover failure to the cell successfully transmitting a handover command to the UE in the latest time before the connection fails.

5. The apparatus according to claim 3, wherein the receiver is further configured to receive the maximum measurement result of the downlink signal notified by a network side, after the connection failure occurs in the UE.

6. The apparatus according to claim 2, wherein the processing circuit is further configured to perform:

a fifth judging to, when the time period experienced by the UE from receiving a handover command message for the last time to the occurrence of a connection failure is less than a third predefined value, the reestablished cell of the UE is the cell successfully transmitting a handover command to the UE in the latest time before the connection fails, and the maximum measurement result of the downlink signal is less than a fourth predefined value, judge that the type of the handover failure is too-early handover of the latest handover before the connection fails;

a sixth judging to, when the time period experienced by the UE from receiving a handover command message for the last time to the occurrence of a connection failure is less than the third predefined value, the reestablished cell of the UE is the cell successfully transmitting a handover command to the UE in the latest time before the connection fails, and the maximum measurement result of the downlink signal is greater than the fourth predefined value, judge that the type of the handover failure is too-late handover of handover from the serving cell to the reestablished cell;

a seventh judging to, when the time period experienced by the UE from receiving a handover command message for the last time to the occurrence of a connection failure is less than the third predefined value, the reestablished cell of the UE is not the target cell or the cell successfully transmitting a handover command to the UE in the latest time before the connection fails, and the maximum measurement result of the downlink signal is less than the fourth predefined value, judge that the type of the handover failure is handover to wrong cell of the latest handover before the connection fails; and an eighth judging to, when the time period experienced by the UE from receiving a handover command message for the last time to the occurrence of a connection failure is less than the third predefined value, the reestablished cell of the UE is not the target cell or the cell successfully transmitting a handover command to the UE in the latest time before the connection fails, and the maximum measurement result of the downlink signal is greater than the fourth predefined value, judge that the type of the handover failure is too-late handover of handover from the serving cell to the reestablished cell.

7. The apparatus according to claim 6, wherein the receiver is further configured to receive the maximum measurement result of the downlink signal notified by a network side, after the connection failure occurs in the UE.

8. The apparatus according to claim 6, wherein the receiver is further configured to receive the maximum measurement result of the downlink signal notified by a network side, after the connection failure occurs in the UE.

9. A User Equipment (UE), comprising:

a recording circuit configured to record a maximum measurement result of a downlink signal, the maximum measurement result of a downlink signal being measured by the UE at a serving cell where the UE is present before connection fails; and a reporting circuit configured to report the maximum measurement result of the downlink signal to a network side after a connection failure occurs in the UE, wherein the network side is a reestablished cell or a newly-established cell to which the UE is connected through reestablishment or new establishment after the connection fails.

10. The UE according to claim 9, wherein the UE further comprises:

a processing circuit configured to judge whether the serving cell is a relatively small cell; and when a judgment result is yes, the recording circuit records the maximum measurement result of the downlink signal measured by the UE at the serving cell.

11. An apparatus for judging type of handover failure, wherein the apparatus is configured at a network side, the network side being a reestablished cell or a newly-established cell to which a User Equipment (UE) is connected through reestablishment or new establishment after the connection fails, and the apparatus comprises:

a receiver configured to, after a connection failure occurs in the UE, receive a maximum measurement result of a downlink signal reported by the UE, the maximum measurement result of a downlink signal being measured by the UE at a serving cell where the UE is present before the connection fails; and a notifying circuit configured to report the maximum measurement result of the downlink signal to the serving cell where the UE is present before the connection fails, so that the serving cell judges type of the handover failure by using the maximum measurement result of the downlink signal.

* * * * *